United States Patent
Tsuji et al.

(10) Patent No.: US 9,811,740 B2
(45) Date of Patent: Nov. 7, 2017

(54) COMPUTER-READABLE MEDIUM STORING THEREIN IMAGE PROCESSING PROGRAM, IMAGE PROCESSING DEVICE, AND IMAGE PROCESSING METHOD

(71) Applicant: FUJITSU LIMITED, Kawasaki-shi, Kanagawa (JP)

(72) Inventors: Kentaro Tsuji, Kawasaki (JP); Akihiro Minagawa, Tachikawa (JP); Yusuke Uehara, Kawasaki (JP); Mingxie Zheng, Kawasaki (JP); Yuji Matsuda, Kawasaki (JP); Nobuhiro Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 15/050,899

(22) Filed: Feb. 23, 2016

(65) Prior Publication Data
US 2016/0253565 A1 Sep. 1, 2016

(30) Foreign Application Priority Data
Feb. 27, 2015 (JP) .................................. 2015-039136

(51) Int. Cl.
G06K 9/00 (2006.01)
G06K 9/68 (2006.01)
G06K 9/46 (2006.01)

(52) U.S. Cl.
CPC ..... G06K 9/00771 (2013.01); G06K 9/00228 (2013.01); G06K 9/00369 (2013.01); G06K 9/685 (2013.01); G06K 9/4642 (2013.01)

(58) Field of Classification Search
CPC ........... G06K 9/00771; G06K 9/00369; G06K 9/685; G06K 9/4642; G06K 9/00228
(Continued)

(56) References Cited

U.S. PATENT DOCUMENTS

2005/0238217 A1* 10/2005 Enomoto ........... G06K 9/00597
382/128
2013/0051662 A1 2/2013 Shiozaki et al.

FOREIGN PATENT DOCUMENTS

JP 2013-045433 A 3/2013

OTHER PUBLICATIONS

Constantine P. Papageorgiou et al.,"A General Framework for Object Detection", IEEE Computer Society, Sixth International Conference on Computer Vision, pp. 555-562, Jan. 1998 (8 pages).
(Continued)

*Primary Examiner* — Gregory F Cunningham
(74) *Attorney, Agent, or Firm* — Fujitsu Patent Center

(57) ABSTRACT

A non-transitory computer-readable storage medium storing an image processing device that causes a computer to execute a process includes: individually detecting, as a detection target candidate, a first portion of each of detection targets that appear in an image imaged by an imaging device, by using a first detection area corresponding to the first portion; detecting a detection target for a detection target candidate corresponding to a detection target that is not covered by another detection target and that is included in the detected detection target candidates, by using a second detection area corresponding to a second portion including the first portion; and detecting a detection target for a detection target candidate corresponding to a detection target, covered by another detection target and included in the detected detection target candidates, by using a third detection area that corresponds to a third portion including the first portion.

6 Claims, 11 Drawing Sheets

(58) Field of Classification Search
USPC .......................................................... 382/103
See application file for complete search history.

(56) References Cited

OTHER PUBLICATIONS

Navneet Dalal et al.,"Histograms of Oriented Gradients for Human Detection", IEEE Computer Society, International Conference on Computer Vision & Pattern Recognition(CVPR'05), vol. 1, pp. 866-893, Jun. 2005 (8 pages).

* cited by examiner

COMPUTER-READABLE MEDIUM STORING THEREIN IMAGE PROCESSING PROGRAM, IMAGE PROCESSING DEVICE, AND IMAGE PROCESSING METHOD

CROSS-REFERENCE TO RELATED APPLICATION

This application is based upon and claims the benefit of priority of the prior Japanese Patent Application No. 2015-039136, filed on Feb. 27, 2015, the entire contents of which are incorporated herein by reference.

FIELD

The embodiments discussed herein are related to a computer-readable medium storing therein an image processing program, an image processing device, and an image processing method.

BACKGROUND

In recent years, detection targets, which appear in video pictures imaged by monitoring cameras and so forth installed in various places such as offices, shopping centers, and shopping areas, have been detected.

As a technology for detecting humans as detection targets, a technology for detecting humans from an image by applying detectors for detecting a part of a physical body of a human or a whole body thereof is disclosed in, for example, Japanese Laid-open Patent Publication No. 2013-45433.

SUMMARY

In accordance with an aspect of the embodiments, a non-transitory computer-readable storage medium storing an image processing device that causes a computer to execute a process includes: individually detecting, as a detection target candidate, a first portion of each of detection targets that appear in an image imaged by an imaging device, by using a first detection area corresponding to the first portion; detecting a detection target for a detection target candidate corresponding to a detection target that is not covered by another detection target and that is included in the detected detection target candidates, by using a second detection area corresponding to a second portion including the first portion; and detecting a detection target for a detection target candidate corresponding to a detection target, covered by another detection target and included in the detected detection target candidates, by using a third detection area that corresponds to a third portion including the first portion and whose amount of overlapping with the second detection area is less than a predetermined amount.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Hereinafter, examples of the disclosed technology will be described in detail with reference to drawings.

Figure 1:
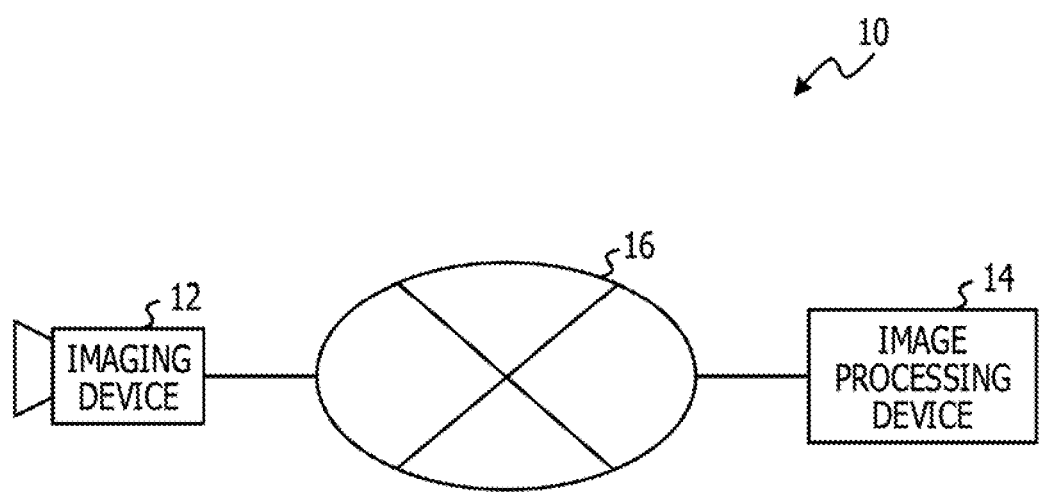
FIG. 1 is a schematic configuration diagram of an example of a human detection system according to the present embodiment.

FIG. 1 is a schematic configuration diagram of an example of an image processing system 10 according to the present embodiment. As illustrated in FIG. 1, the image processing system 10 includes an imaging device 12 and an image processing device 14. The imaging device 12 and the image processing device 14 are connected to each other via a network 16. Note that the number of the imaging devices 12 included in the image processing system 10 is not limited to one illustrated in FIG. 1 and may be two or more.

The image processing system 10 illustrated in FIG. 1 has a function of detecting a human that appears in a video picture imaged by the imaging device 12.

The imaging device 12 is a so-called monitoring camera, which has a function of imaging video pictures in a predetermined area. The imaging device 12 of the present embodiment continuously images moving images of a monitoring area, and the imaged video pictures (moving images) are output to the image processing device 14 via the network 16.

The image processing device 14 has a function of detecting a human (specifically, an image expressing the human) in a video picture imaged by the imaging device 12.

Figure 2:
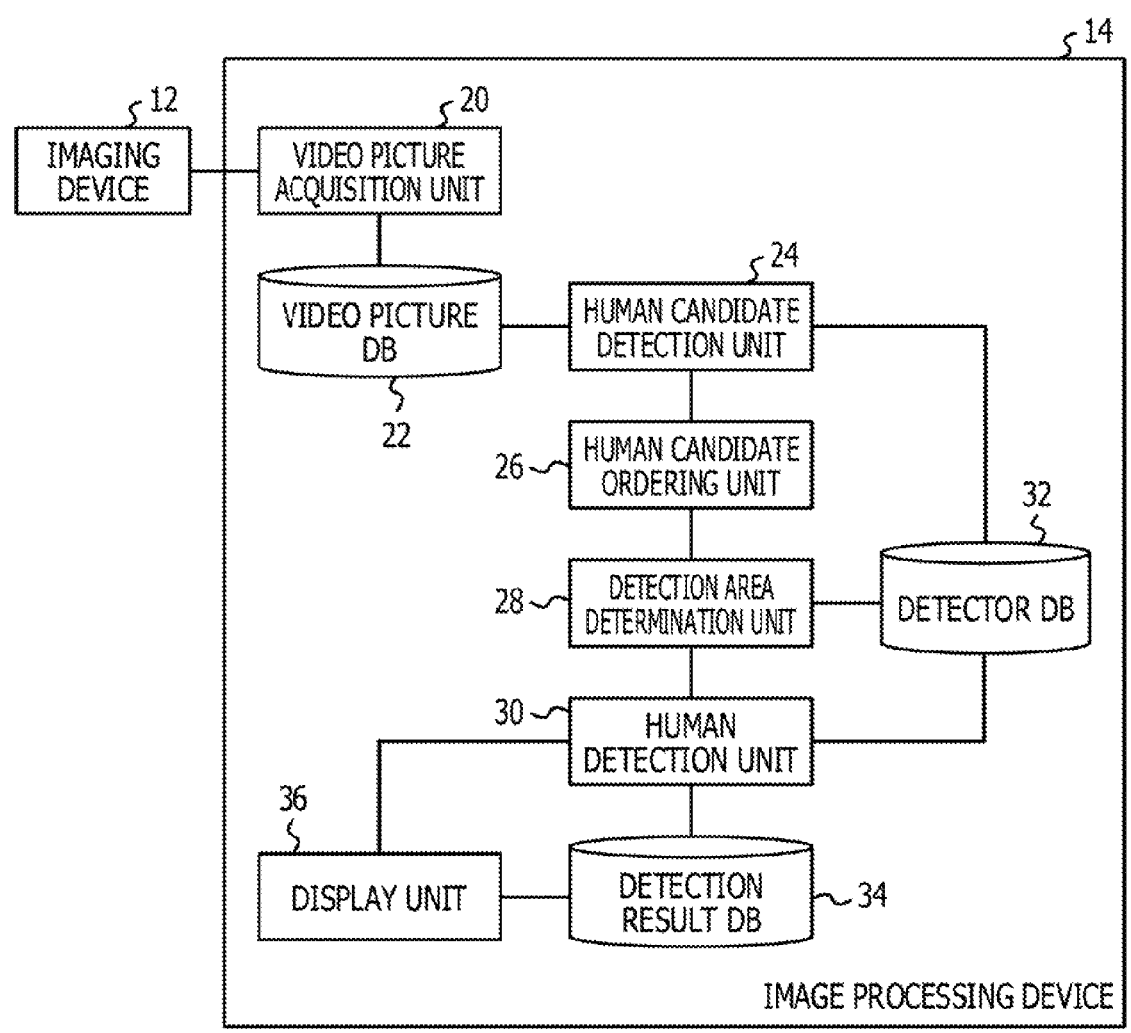
FIG. 2 is a functional block diagram illustrating a functional schematic configuration of an example of an image processing device according to the present embodiment.

FIG. 2 illustrates a functional block diagram illustrating a functional schematic configuration of an example of the image processing device 14 of the present embodiment.

As illustrated in FIG. 2, the image processing device 14 includes a video picture acquisition unit 20, a video picture data base (DB) 22, a human candidate detection unit 24, a human candidate ordering unit 26, a detection area determination unit 28, a human detection unit 30, a detector DB 32, a detection result DB 34, and a display unit 36. The human candidate detection unit 24 is an example of a first detection unit in the disclosed technology. The human candidate ordering unit 26, the detection area determination unit 28, and the human detection unit 30 correspond to an example of a second detection unit in the disclosed technology.

The video picture acquisition unit 20 has a function of acquiring, from the imaging device 12, video pictures imaged by the imaging device 12. The video pictures acquired by the video picture acquisition unit 20 are stored in the video picture DB 22.

The human candidate detection unit 24 converts the video pictures serving as moving images imaged by the imaging device 12 into images (still images) for respective frames. In addition, the human candidate detection unit 24 has a function of detecting a human candidate serving as a candidate for a human (human image) by applying, to the whole converted image, a detector whose detection area is the smallest among detectors stored in the detector DB 32.

The human candidate ordering unit 26 has a function of ordering, at the time of imaging, the human candidates detected by the human candidate detection unit 24 in order from a side near to the imaging device 12 (hereinafter, called a "near side") (in ascending order of distance from the imaging device 12).

The detection area determination unit 28 has a function of determining a detection area (detector) for verifying whether or not one out of the human candidates detected by the human candidate detection unit 24 is a human. The detection area determination unit 28 of the present embodiment has a function of determining a detection area (detector) in consideration of a case where a part of a physical body of a human who appears on a back side is covered by a human who appears on the near side.

The human detection unit 30 has a function of detecting a human (human image) by verifying, by using of a detector determined by the detection area determination unit 28, whether a corresponding human candidate is a human. A detection result of the human detection unit 30 is stored in the detection result DB 34.

The display unit 36 has a function of displaying, for example, information relating to a detected human.

In order to detect a human (human image) from an image, the image processing device 14 of the present embodiment uses detectors. In the detectors, respective detection areas in which corresponding ranges out of a physical body of a human body are different from one another are set, and the sizes (areas) of the set detection areas are different from one another. The detectors are stored in the detector DB 32. Therefore, the detector DB 32 has a function of storing therein the detectors.

Figure 3:
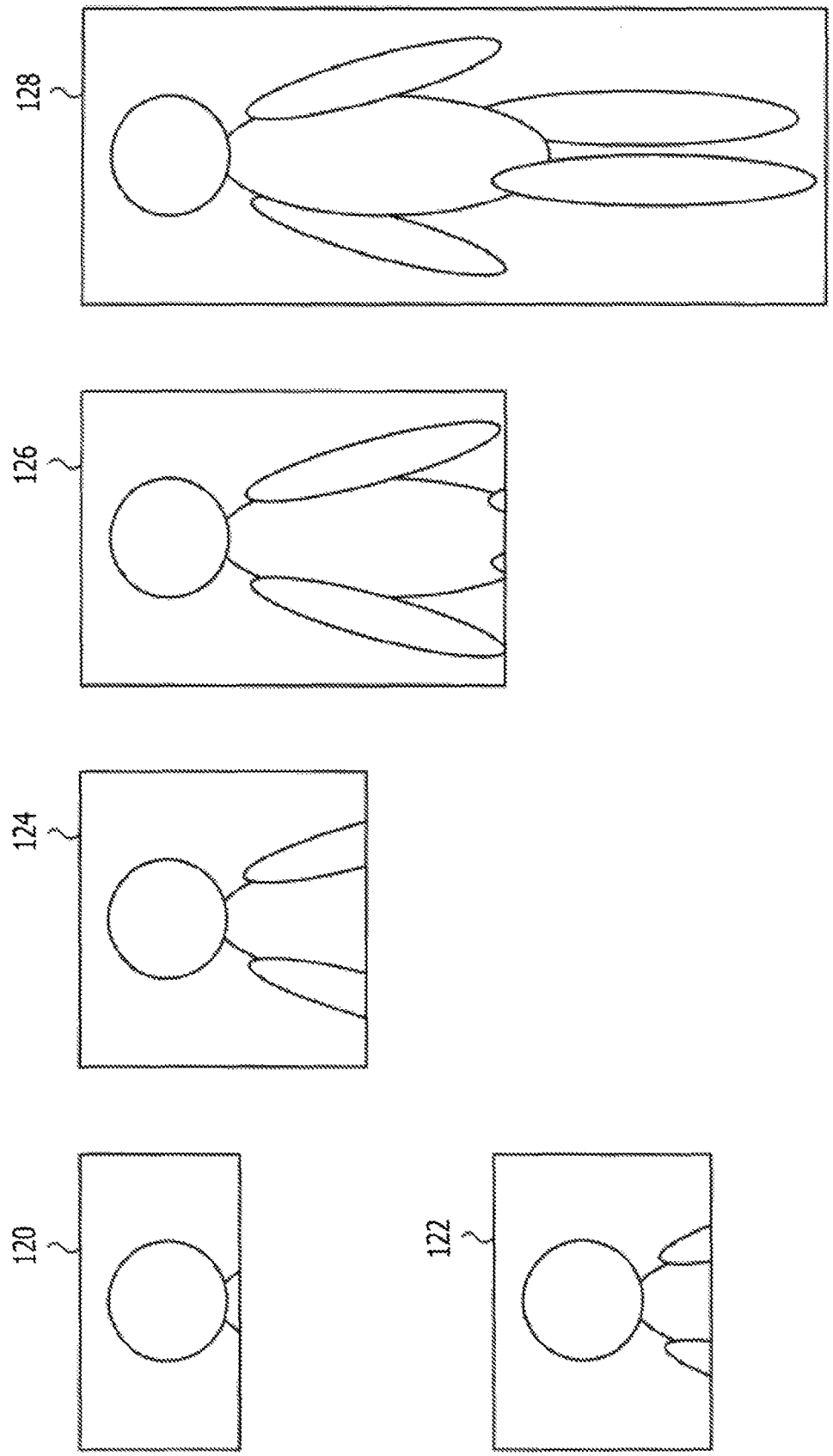
FIG. 3 is a diagram for explaining specific examples of detectors stored in a detector data base according to the present embodiment.

FIG. 3 illustrates a diagram for explaining specific examples of the detectors (detection areas) stored in the detector DB 34 of the present embodiment. As illustrated in FIG. 3, as specific examples, five detectors whose sizes (areas) of the detection areas are different from one another are stored in the detector DB 32 of the present embodiment.

A detector (detection area) 120 is used for detecting a head part (a part from the neck up) of a human and is a detector whose detection area is an area including the head part. A detector (detection area) 122 is used for detecting a part from shoulders of a human up and is a detector whose detection area is an area including the part from the shoulders up. A detector (detection area) 124 is used for detecting a part corresponding to a head and shoulders of a human and is a detector whose detection area is an area including the part corresponding to the head and the shoulders. A detector (detection area) 126 is used for detecting an upper body (a part from the waist up) and is a detector whose detection area is an area including the upper body part. A detector (detection area) 128 is used for detecting a whole body of a human and is a detector whose detection area is an area including the whole body. The detectors (detection areas) 120 to 128 each include the head part of a human.

In addition, the detector 122 includes the detection area of the detector 120. The detector 124 includes the detection areas of the detector 120 and the detector 122. The detector 126 includes the detection areas of the detector 120, the detector 122, and the detector 124. The detector 128 includes the detection areas of the detector 122, the detector 124, and the detector 126.

In addition, in the present embodiment, the widths of the respective detection areas (in a horizontal direction or a shoulder-width direction of a human in FIG. 3) are equal in the detectors 120 to 128 in a case where the sizes of the commonly included head parts are equal.

The detector 120 of the present embodiment is an example of a first detector in the disclosed technology, the detection area of the detector 120 is an example of a first detection area in the disclosed technology, and the head part is an example of a first portion in the disclosed technology. In addition, the detectors 120 to 128 of the present embodiment are examples of a second detector in the disclosed technology, and the detection areas of the detectors 120 to 128 are examples of a second detection area and a third detection area in the disclosed technology. In addition, parts of the human body, included in the detection areas of the respective detectors 120 to 128, correspond to examples of the second detection area and the third detection area in the disclosed technology.

Note that detectors used by the image processing device 14 for detecting a human are not limited to the detectors 120 to 128. In the image processing device 14 of the present embodiment, the head part of a human only has to be included, and other parts of the physical body are not limited in particular. In addition, the number of detectors only has to be two or more and is not limited in particular.

Figure 4:
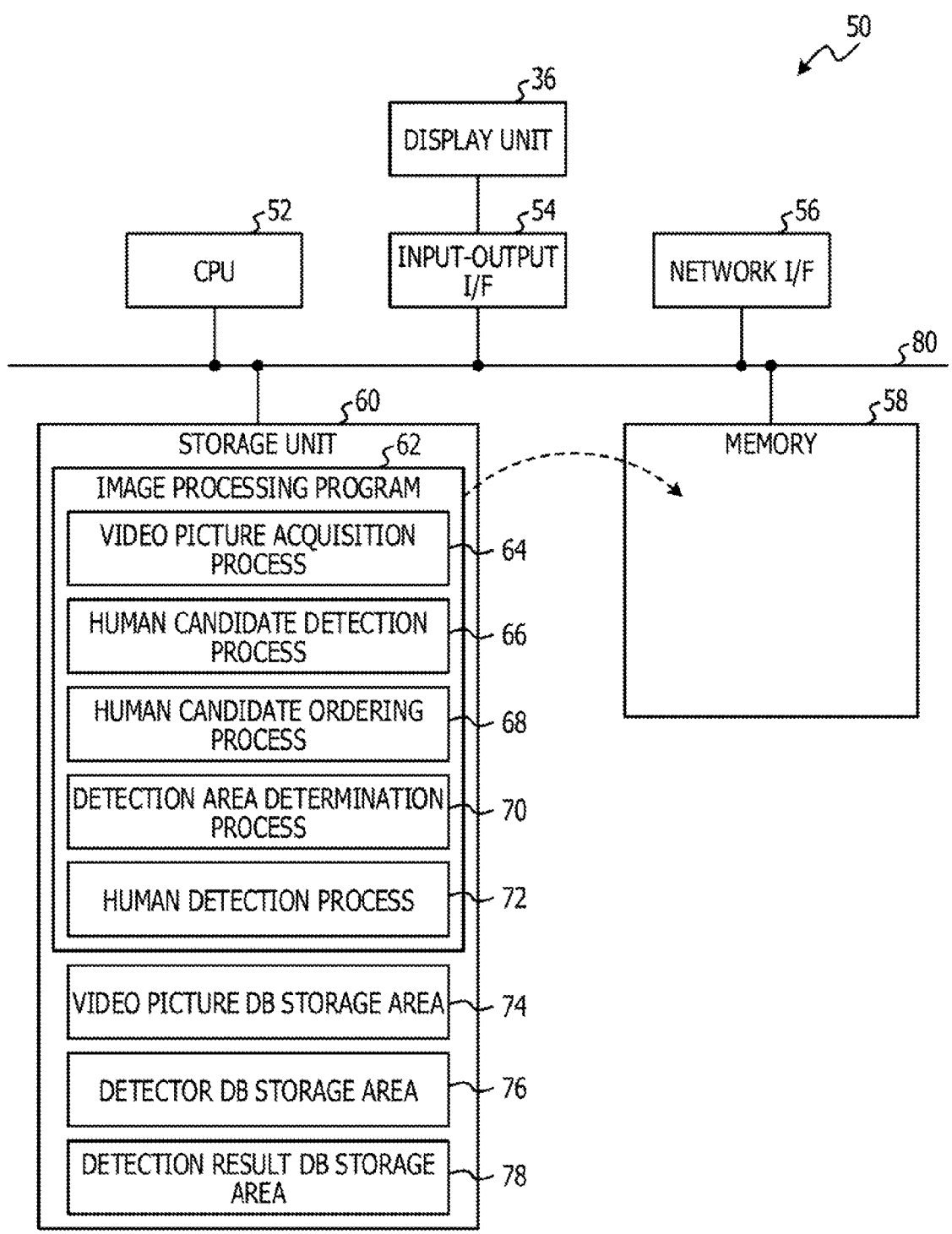
FIG. 4 is a block diagram illustrating a schematic configuration of an example of a computer that functions as the image processing device according to the present embodiment.

Note that it is possible to realize the image processing device 14 by using, for example, a computer 50 illustrated in FIG. 4. The computer 50 includes a central processing unit (CPU) 52, an input-output interface (I/F) 54, a network I/F 56, a memory 58, and a non-volatile storage unit 60. The CPU 52, the input-output I/F 54, the network I/F 56, the memory 58, and the storage unit 60 are connected to one another via a bus 80. The network. I/F 56 is connected to the imaging device 12 via the network 16.

It is possible to realize the storage unit 60 by using a hard disk drive (HDD), a flash memory, or the like. In the storage unit 60 serving as a storage medium, an image processing program 62 is stored in order to cause the computer 50 to function as the image processing device 14. The CPU 52 reads and deploys the image processing program 62 from the storage unit 60 and in the memory 58 and sequentially performs individual processes included in the image processing program 62.

The image processing program 62 includes a video picture acquisition process 64, a human candidate detection process 66, a human candidate ordering process 68, a detection area determination process 70, and a human detection process 72.

In addition, a video picture DB storage area 74 in the storage unit 60 functions as a storage area in which the video picture DB 22 is stored. In addition, a detector DB storage area 76 in the storage unit 60 functions as a storage area in which the detector DB 32 is stored. In addition, a detection result DB storage area 78 in the storage unit 60 functions as a storage area in which the detection result DB 34 is stored.

By performing the video picture acquisition process 64, the CPU 52 operates as the video picture acquisition unit 20. In addition, by performing the human candidate detection process 66, the CPU 52 operates as the human candidate detection unit 24. In addition, by performing the human candidate ordering process 68, the CPU 52 operates as the human candidate ordering unit 26. In addition, by performing the detection area determination process 70, the CPU 52 operates as the detection area determination unit 28. In addition, by performing the human detection process 72, the CPU 52 operates as the human detection unit 30.

From this, the computer 50 that performs the image processing program 62 functions as the image processing device 14.

Note that the computer 50 is not limited to a so-called desktop type personal computer. The computer 50 may be a laptop type personal computer and may be one of personal digital assistants (PDA) typified by tablet terminals and smartphones.

Note that it is possible to realize the image processing device 14 by using, for example, a semiconductor integrated circuit, in more detail, an application specific integrated circuit (ASIC) or the like.

Next, a function based on the image processing device 14 according to the present embodiment will be described.

The video picture acquisition unit 20 in the image processing device 14 acquires, via the network 16, video pictures imaged by the imaging device 12 and preliminarily stores the video pictures in the video picture DB 22 before performing image processing. A timing when the video picture acquisition unit 20 acquires and stores the video pictures in the video picture DB 22 is not limited in particular. As such a timing, for example, a timing by every predetermined time period such as, for example, every 10 minutes or every several hours may be cited. In addition, in accordance with, for example, a timing when the imaging device 12 images, imaged video pictures may be acquired in real time.

Figure 5:
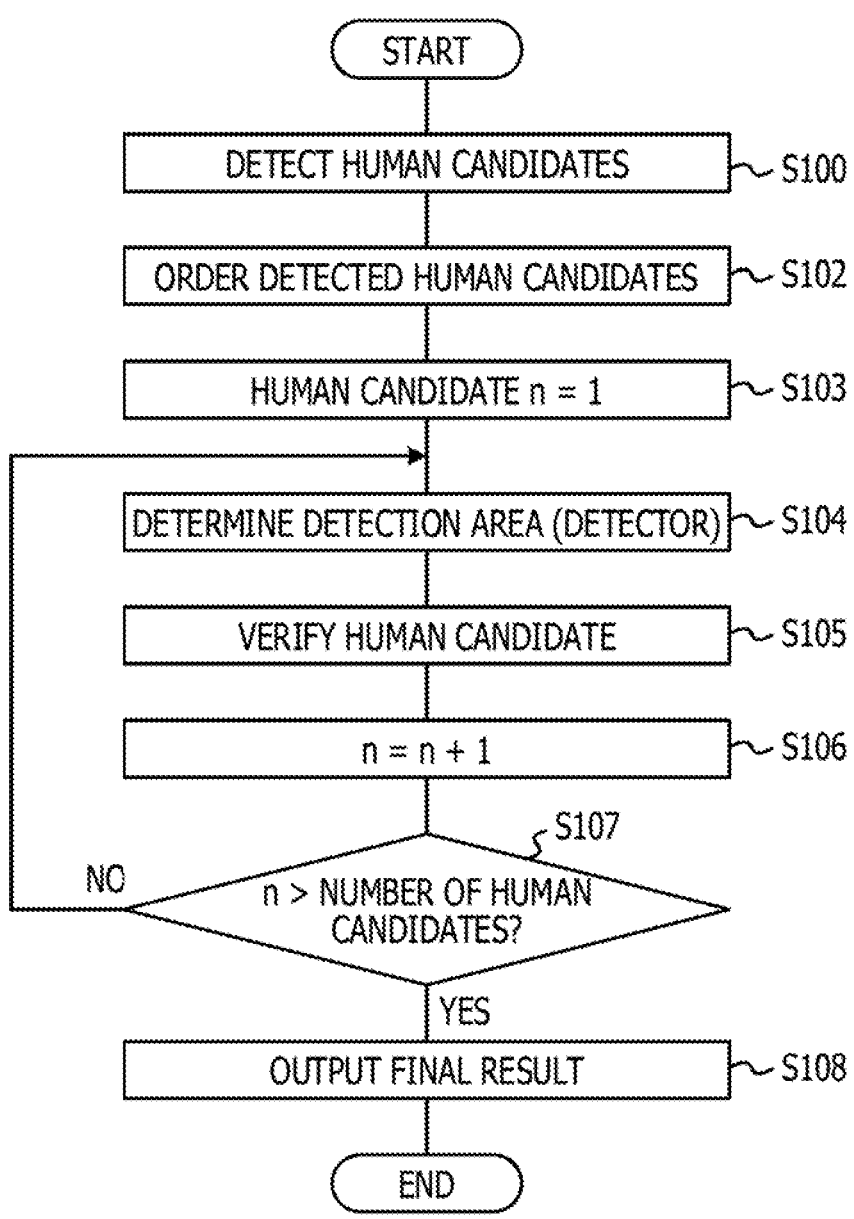
FIG. 5 is a flowchart illustrating an example of image processing performed in the image processing device according to the present embodiment.

In the image processing device 14 of the present embodiment, in a state in which the video pictures are stored in the video picture DB 22, the image processing is performed. The image processing performed in the image processing device 14 of the present embodiment will be described. FIG. 5 illustrates a flowchart of an example of the image processing performed in the image processing device 14 of the present embodiment.

In the image processing device 14 of the present embodiment, the image processing illustrated in FIG. 5 is performed at a predetermined timing or a timing specified by a user who desires to detect a human from an image. While the predetermined timing is not limited in particular, a timing by every predetermined time period such as, for example, every 10 minutes or every several hours may be cited. In addition, without being performed at a predetermined timing, the image processing illustrated in FIG. 5 may be performed in conjunction with, for example, a timing when the video picture acquisition unit 20 acquires and stores the video pictures from the imaging device 12 and in the video picture DB 22.

Figure 6:
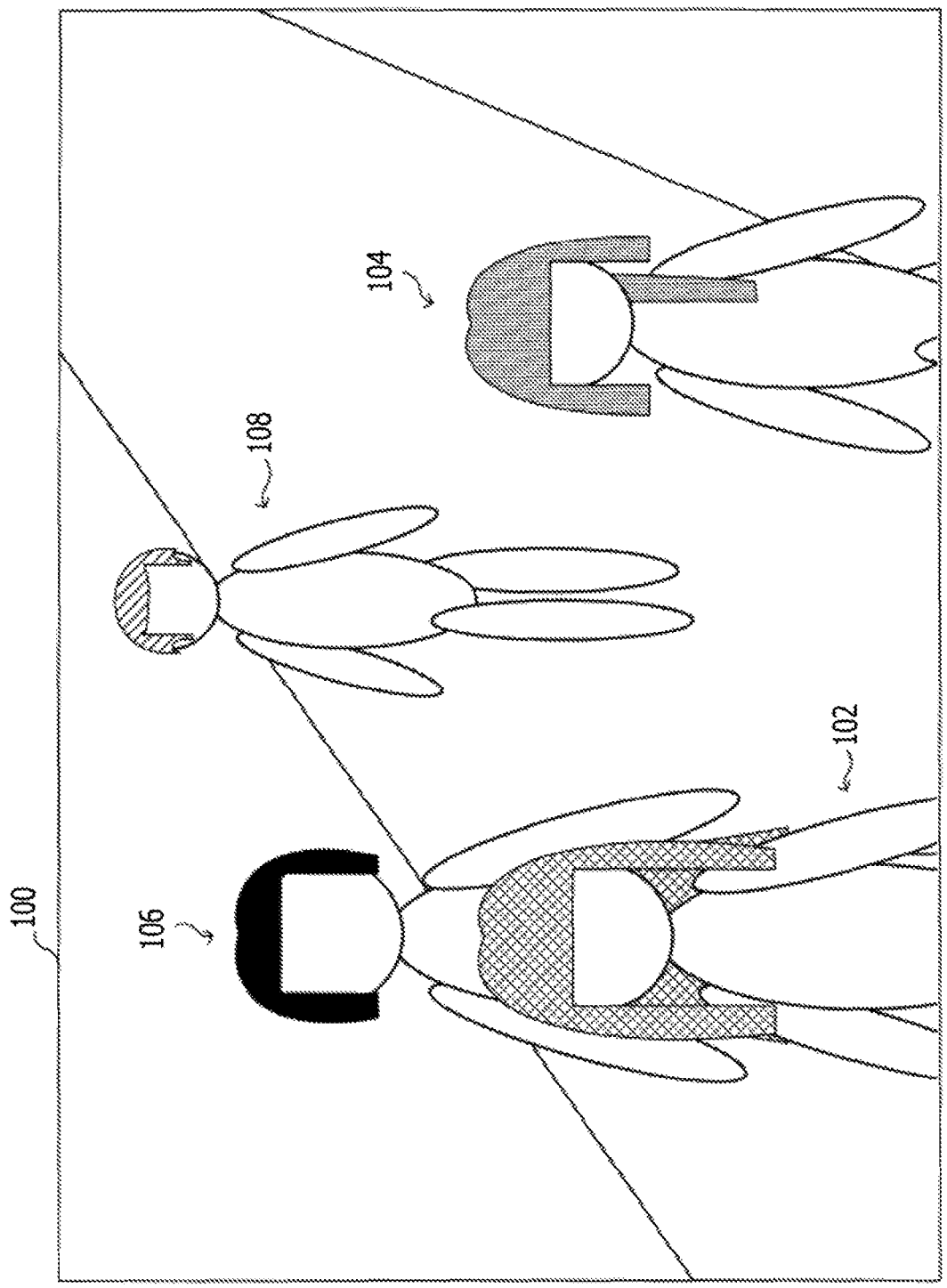
FIG. 6 is a pattern diagram of an example of an image converted by a human candidate detection unit according to the present embodiment.

In step S100, the human candidate detection unit 24 detects human candidates from within a video picture (image). Specifically, the human candidate detection unit 24 reads and converts video pictures from the video picture DB 22 and into an image (still image) for each of frames. FIG. 6 illustrates a pattern diagram of an example of an image converted by the human candidate detection unit 24 of the present embodiment. FIG. 6 illustrates an image 100 in which four humans (humans 102, 104, 106, and 108) appear. The four humans are on the near side in the order of the human 102, the human 104, the human 106, and the human 108. In addition, a part of the body of the human 106 hides behind the human 102. In what follows, as a specific example, a case of detecting the humans who appear in the pattern diagram illustrated in FIG. 6 will be described.

Figure 7:
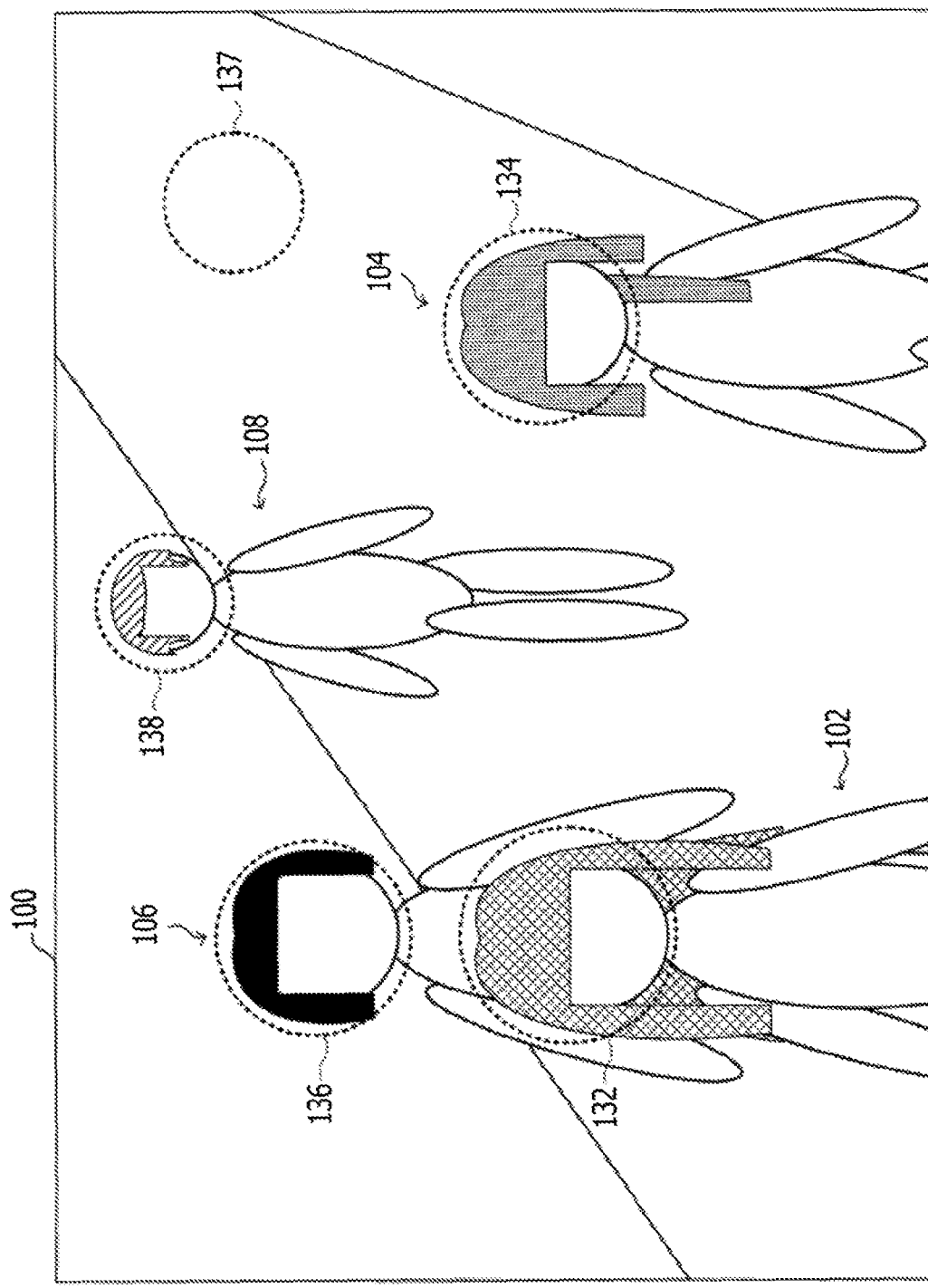
FIG. 7 is a pattern diagram of examples of human candidates detected from the image illustrated in FIG. 6.

The human candidate detection unit 24 detects a human candidate serving as a candidate for a human (human image) by applying, to the whole image, a detector whose detection area is the smallest among detectors stored in the detector DB 32. In the present embodiment, since the detection area of the detector 120 for detecting a head part of a human is the smallest, a human candidate is detected from the image 100 by applying the detector 120. FIG. 7 illustrates a pattern diagram of examples of human candidates detected from the image 100 illustrated in FIG. 6. As illustrated in FIG. 6, five human candidates of human candidates 132, 134, 136, 137, and 138 are detected from the image 100 by the detector 120. The human candidates 132, 134, 136, and 138 correspond to the head parts of the humans 102, 104, 106, and 108, respectively. While actually no human appears, the human candidate 137 is a human candidate detected by the detector 120.

Note that a method for detecting a human candidate by using a detector is not limited in particular and methods described in, for example, the following literatures may be used.

Papageorgiou, C. P., Oren, M., and Poggio, T., "A general framework for object detection", *IEEE computer Vision and Pattern Recognition*, pp. 511-562, 1998.

Dalai, N, and Triggs, B., "Histograms of Oriented Gradients for Human Detection", *IEEE computer Vision and Pattern Recognition*, pp. 886-893, 2005.

In subsequent step S102, the human candidate ordering unit 26 orders the detected human candidates. In the human candidate ordering unit 26 of the present embodiment, when the imaging device 12 images humans, human images corresponding to respective humans are ordered in order of the humans, starting from a human closest to the near side. A specific method used by the human candidate ordering unit 26 for ordering human candidates is not limited in particular.

In the image processing device 14 of the present embodiment, the order of ordering, such as ordering in order starting from a position within an image, is defined in accordance with, for example, a position and an orientation with respect to humans at the time of the imaging device 12 imaging the humans. In the present embodiment, as a specific example, an image for detecting a human is an image in a case where the imaging device 12 installed in an upper portion such as a ceiling images humans in an obliquely downward direction, and humans located on the near side at the time of being imaged appear on the lower side of the image. Therefore, the human candidate detection unit 24 orders human candidates in ascending order of position within the image, starting from a human candidate on the lower side.

Note that the position and orientation of the imaging device 12 may be preliminarily associated with the order of ordering and the human candidate ordering unit 26 may acquire the order of ordering from the association in accordance with the position and orientation of the imaging device 12. In addition, the position and orientation of the imaging device 12 may be preliminarily stored within the image processing device 14 and may be acquired from the imaging device 12.

In addition, the order of ordering may be experimentally obtained in advance by using, for example, an image image-captured by the imaging device 12, and the order may be stored within the image processing device 14.

In addition, as a human is located on the nearer side, a human image that appears tends to become larger. Therefore, without limitation to the above description, the order of ordering may be judged in accordance with the size of the human image, especially in accordance with the size of a predetermined part, and human candidates may be ordered based on the order.

Figure 8:
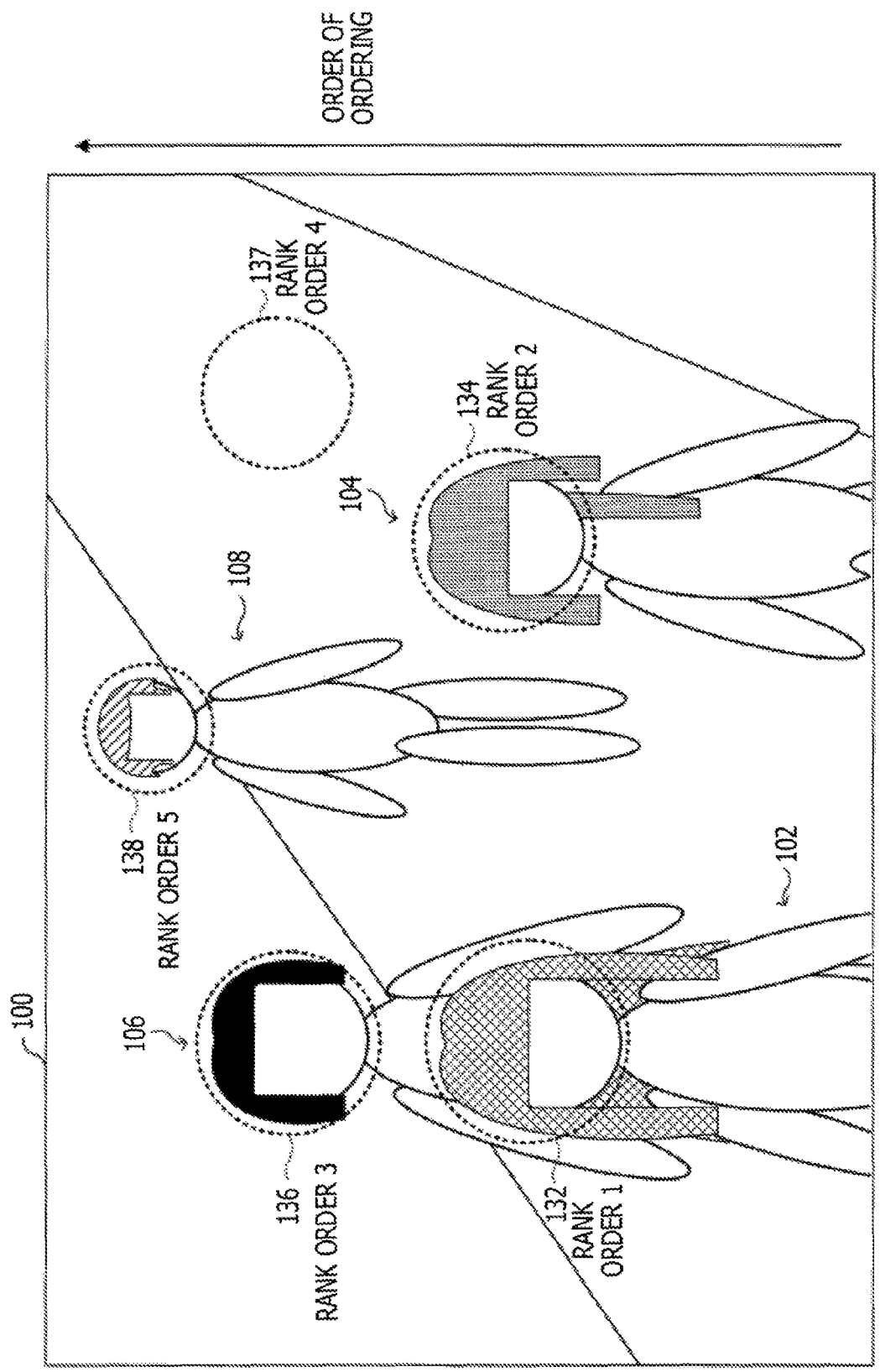
FIG. 8 is a pattern diagram of an example of an order of ordering the human candidates detected from the image illustrated in FIG. 6.

FIG. 8 illustrates a pattern diagram of an example of an order of ordering the human candidates detected from the image 100 illustrated in FIG. 6. As illustrated in FIG. 8, rank orders 1 to 5 are ordered in the order of the human candidate 132, the human candidate 134, the human candidate 136, the human candidate 137, and the human candidate 138.

In subsequent step S104, the detection area determination unit 28 defines a variable for identifying each individual human candidate as n=1 and makes a transition to subsequent step S106.

In step S106, the detection area determination unit 28 determines a detection area (detector) used for verifying a human candidate. Specifically, in consideration of the presence or absence of covering by a human on the near side and the range thereof, the detection area determination unit 28 of the present embodiment determines a detection area and a detector, used for verifying a human candidate for a human on a back side. Note that since, in the present embodiment, the size of a detection area and a detector have a one-to-one correspondence relationship, the detector is unambiguously determined by determining the detection area.

A case where step S106 is performed for the first time after starting the present image processing is a case where the detection area determination unit 28 determines a detection area (detector) used for verifying a human candidate of the rank order 1. Therefore, here a specific determination method for a detection area (detector) used for verifying the human candidate 132 of the rank order 1 will be described.

Figure 9:
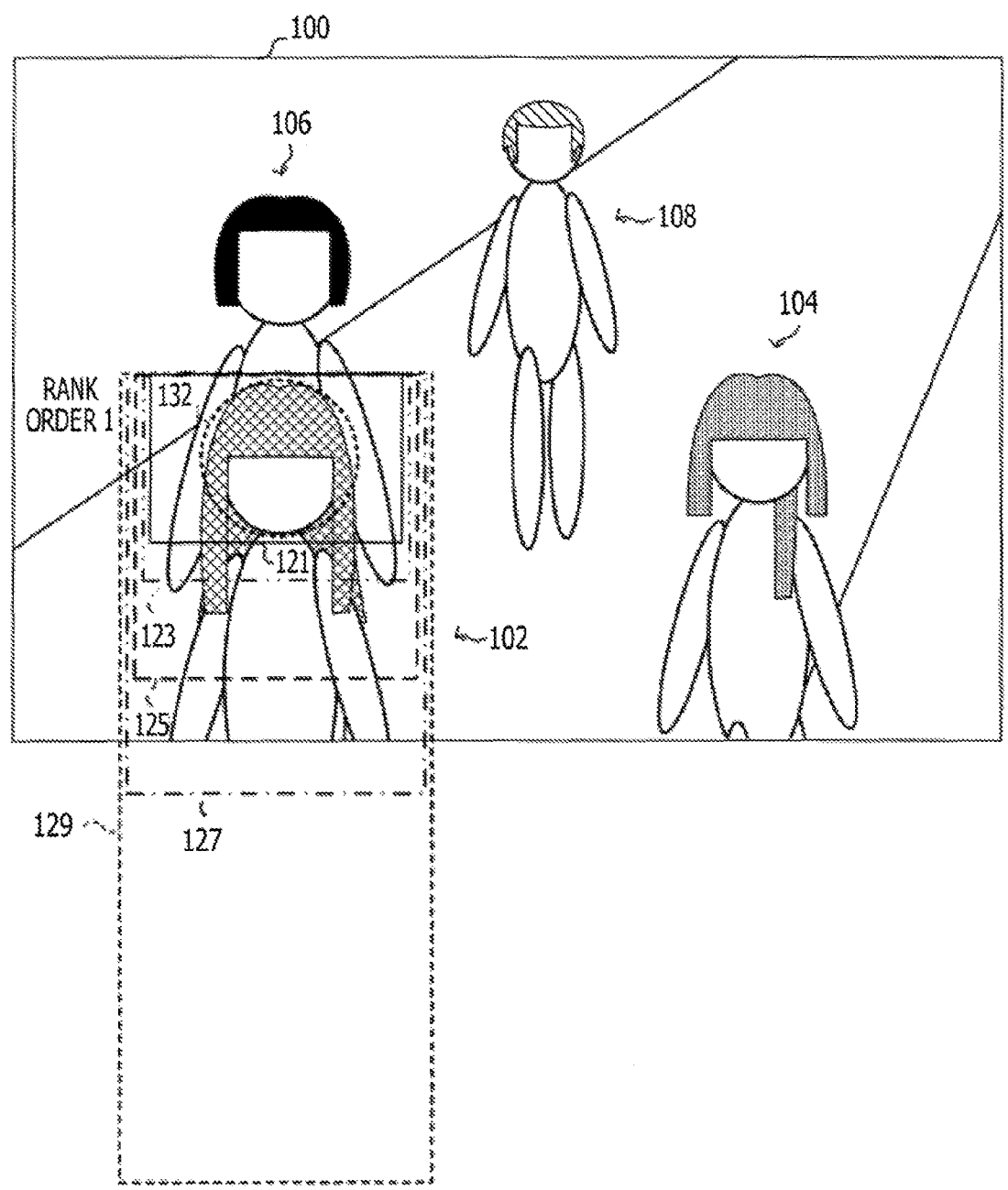
FIG. 9 is a diagram for explaining a determination method for a detection area (detector) used for verifying a human candidate in the image illustrated in FIG. 6.

FIG. 9 illustrates a diagram for explaining a determination method for a detection area (detector) used for verifying the human candidate 132 in the image 100 illustrated in FIG. 6. Note that detection areas 121, 123, 125, 127, and 129 illustrated in FIG. 9 indicate the detection areas of the detectors 120, 122, 124, 126, and 128, respectively. In addition, while, in FIG. 9, for the sake of convenience of illustration, the widths of the detection areas 121 to 129 are illustrated so as to be different, the widths of the respective detection areas are equal.

First, the detection area determination unit 28 estimates ranges of detection areas in a case of applying the individual detectors 120 to 128 to the human candidate 132. Specifically, as illustrated in FIG. 9, the ranges of the detection areas of the individual detectors are applied to the human candidate 132 so that a head part portion at the time of detecting a human candidate in the above-mentioned step S100 and head part portions of the individual detection areas of the detectors 120 to 128 coincide with each other.

Next, the detection area determination unit 28 selects, from among the detection areas 121 to 129, a detection area that falls within the image 100 and that is the widest. In a case of determining a detection area (detector) of the human candidate 132 of the rank order 1, the physical body (image) of the human candidate 132 is not covered by another human (human image). Therefore, here, without consideration of covering by a human, a detection area (detector) is determined. Note that it is desirable that, at this time, overlapping of the detection area with another human is less than or equal to a predetermined percentage. Note that the predetermined percentage only has to be experimentally obtained in advance, based on detection accuracy and a feature of the detector.

In the specific example illustrated in FIG. 9, the detection area determination unit 28 selects the detection area 125 and determines, as a detector, the detector 124 corresponding to the detection area 125.

In subsequent step S108, the human detection unit 30 verifies whether or not the human candidate is a human (human image). Specifically, for the determined detection area, the human detection unit 30 detects a human (human image) by using the determined detector. Note that while, in each of the present step and the above-mentioned step S100, an image of a part of a human or a whole body is detected from an image by using a detector, details of specific detection methods that use detectors may be different.

Note that the human detection unit 30 of the present embodiment stores once verification results for individual human candidates in a storage unit (the illustration thereof is omitted) within the image processing device 14 until verification of all the human candidates detected in the above-mentioned step S100 is completed.

In a case of the human candidate 132, the detection area determination unit 28 performs verification by using the detector 122. From this, a verification result that the human candidate 132 is a human (human image) is obtained.

In subsequent step S110, the human detection unit 30 increments and defines the variable n as n=n+1 and makes a transition to subsequent step S112.

In step S112, the human detection unit 30 determines whether or not the variable n is larger than the number of the detected human candidates. In a case of the image 100, the number of the detected human candidates is "5". Therefore, it is determined whether or not n>5 is satisfied. In a case of obtaining negative determination, the processing returns to step S106, and the above-mentioned processing operations in steps S106 to S110 are repeated.

By repeating the above-mentioned processing operations in steps S106 to S110, determination of a detection area (detector) and verification based on a detector are performed for each of the human candidates 134 to 138, and a detection result of whether or not being a human (human image) is obtained.

Here, from among the above-mentioned repeated processing operations, processing operations in steps S106 and S108 for the human candidate 136 corresponding to the human 106 on the back side, covered by the human 102 on the near side, will be described.

In step S106, the detection area determination unit 28 determines a detection area (detector) used for verifying the human candidate 136.

Figure 10:
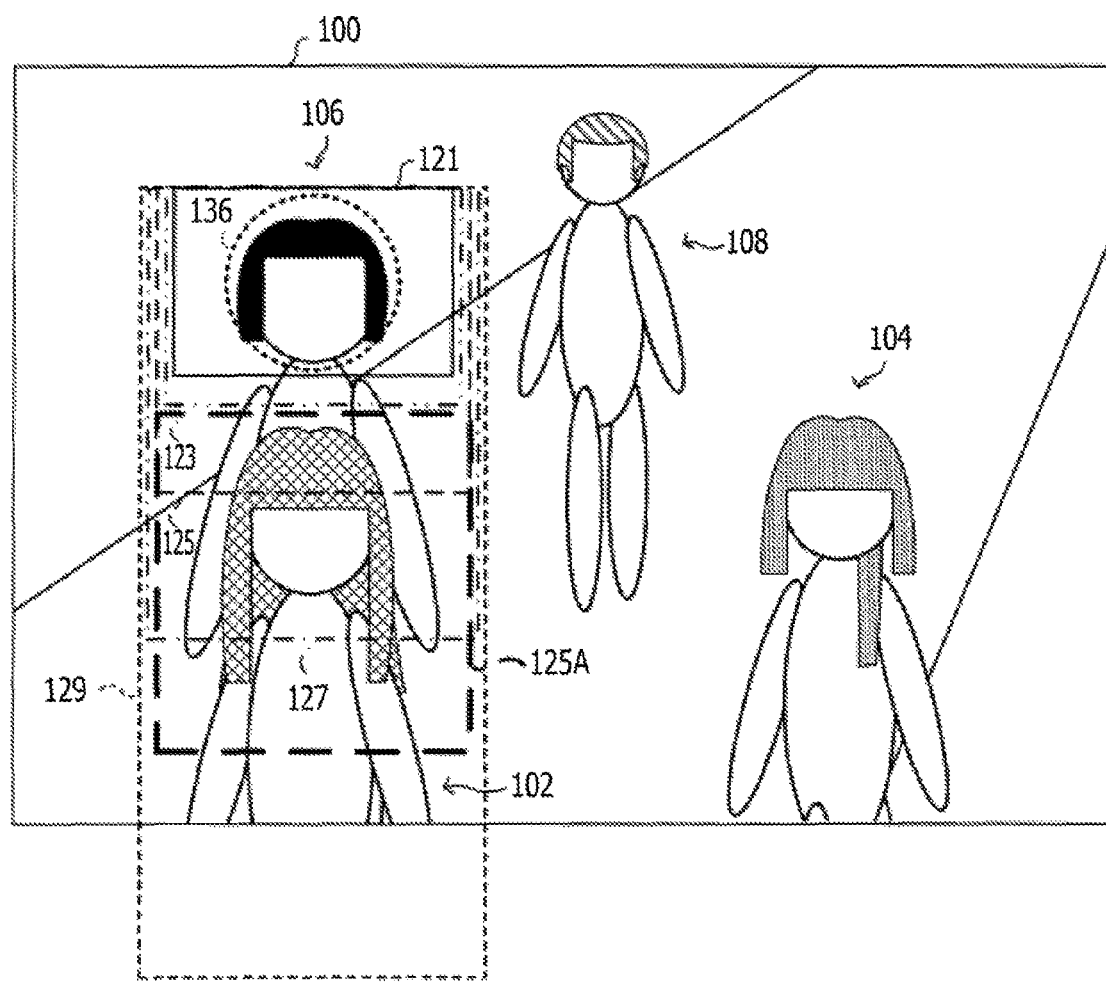
FIG. 10 is a diagram for explaining a determination method for a detection area (detector) used for verifying a human candidate in the image illustrated in FIG. 6.

FIG. 10 illustrates a diagram for explaining a determination method for a detection area (detector) used for verifying the human candidate 136 in the image 100 illustrated in FIG. 6. Note that FIG. 10 illustrates, as a detection area 125A, the detection area of the detector 124, used for verifying the human candidate 132.

First, the detection area determination unit 28 estimates ranges of detection areas in a case of applying the individual detectors 120 to 128 to the human candidate 136. Specifically, as illustrated in FIG. 9, the ranges of the detection areas of the individual detectors are applied to the human candidate 136 so that a head part portion at the time of detecting a human candidate in the above-mentioned step S100 and head part portions of the individual detection areas of the detectors 120 to 128 coincide with each other.

Next, the detection area determination unit 28 selects, from among the detection areas 121 to 129, a detection area that falls within the image 100, whose amount of overlapping with the detection area 125A is less than a predetermined amount, and that is the widest. Here, the "predetermined amount" is an amount experimentally defined in accordance with a feature of a used detector, image quality of an image, desired detection accuracy, and so forth. Note that it is desirable that detection areas determined for the respective human candidates do not overlap with each other.

In the specific example illustrated in FIG. 10, the detection area determination unit 28 selects the detection area 123 and determines, as a detector, the detector 122 corresponding to the detection area 123.

In subsequent step S108, using the detector 122, the human detection unit 30 detects a human (human image) for the human candidate 136. From this, a detection result that the human candidate 136 is a human (human image) is obtained.

In this way, in the image processing device 14 of the present embodiment, a detection result of whether both a human candidate corresponding to a human covered by another human and a human candidate corresponding to a human covered by no other human are humans (human images).

Figure 11:
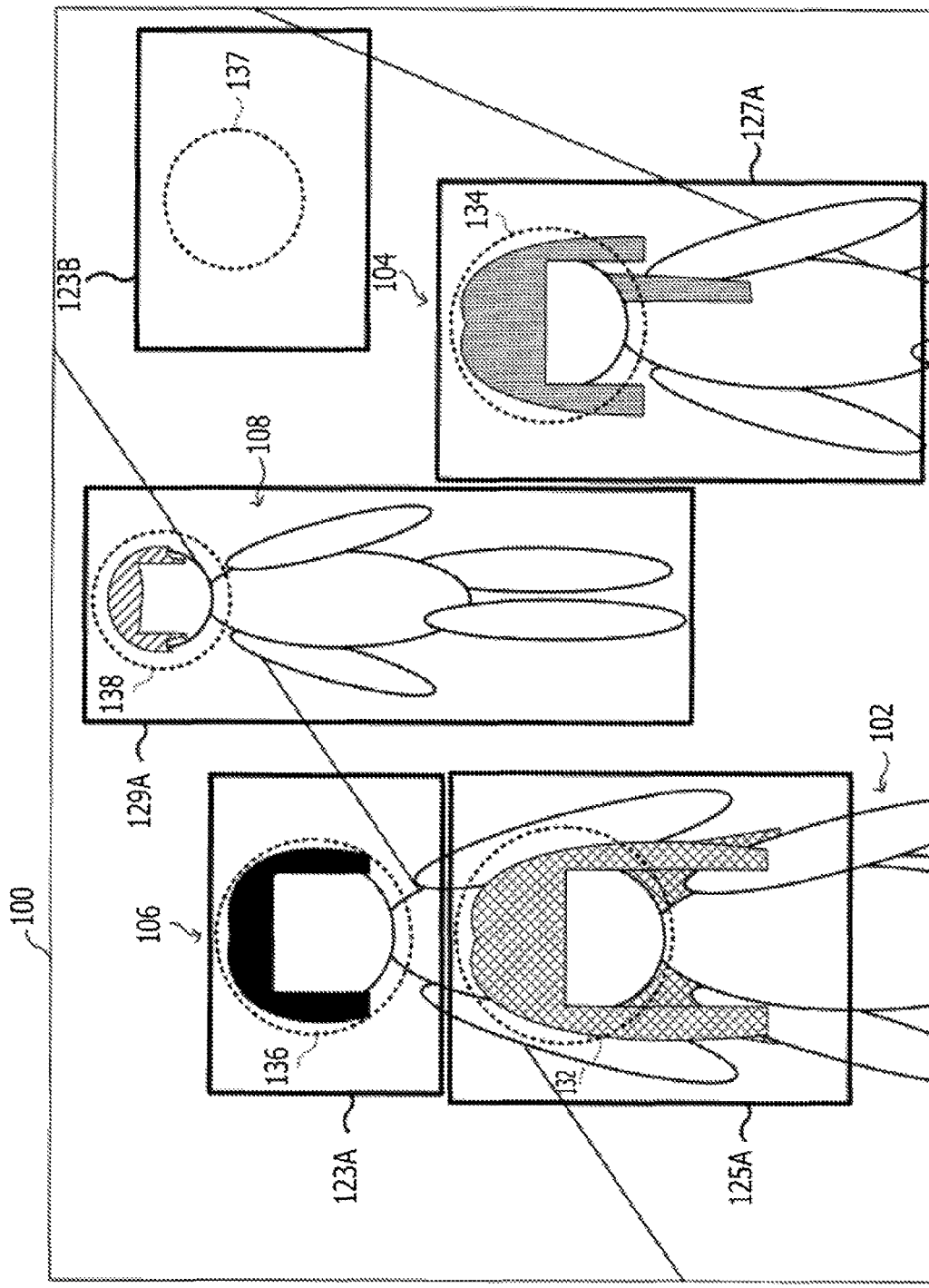
FIG. 11 is a diagram for explaining detection areas corresponding to the respective human candidates in the image illustrated in FIG. 6.

FIG. 11 illustrates a diagram for explaining detection areas corresponding to the respective human candidates 132 to 138 in the image 100 illustrated in FIG. 6. The detection area 125A illustrated in FIG. 11 corresponds to the detection area of the detector 124 used for verifying the human candidate 132. A detection area 127A corresponds to the detection area of the detector 126 used for verifying the human candidate 134. A detection area 123A corresponds to the detection area of the detector 122 used for verifying the human candidate 136. A detection area 123B corresponds to the detection area of the detector 122 used for verifying the human candidate 137. In addition, a detection area 129A corresponds to the detection area of the detector 128 used for verifying the human candidate 138.

As illustrated in FIG. 11, the detection area 123A, the detection area 123B, the detection area 125A, the detection area 127A, and the detection area 129A do not overlap with each other. On the other hand, in a case where affirmative determination is obtained in the above-mentioned step S112, the processing makes a transition to step S114.

After in step S114 the human detection unit 30 outputs, as a final result, the total number of humans within the image, the present processing is terminated.

In the image 100, humans are detected from the human candidates 132, 134, 136, and 138, and no human is detected from the human candidate 137. Therefore, the total number of humans within the image 100 is "4", and the final result is "4".

Note that, in the present embodiment, an output destination of the final result is the detection result DB 34 and the final result is stored in the detection result DB 34. Note that how to store the final result is not limited in particular and the total number of humans within an image only has to be stored while being associated with information for identifying an image or a video picture of a detection source. In addition, information for indicating positions of images of detected humans may be stored along with the total number of humans. In addition, the human detection unit 30 may display a detection result on the display unit 36 in accordance with a desire of a user or the like.

As described above, based on the human candidate detection unit 24, by using the detector 120 whose detection area is the smallest, the image processing device 14 of the present embodiment detects, as human candidates, head parts of humans that appear in an image imaged by the imaging device 12. In addition, the human candidate ordering unit 26 orders human candidates in order starting from the near side. In addition, for a human candidate corresponding to a human, not covered by another human, the detection area determination unit 28 determines a detection area (detector) that includes a head part, that falls within the range of an image, and whose range is the largest. For a detection target candidate corresponding to a human covered by another human, the detection area determination unit 28 determines a detection area (detector) that includes a head part and whose amount of overlapping with a detection area of detecting a human candidate corresponding to a human on the near side is less than a predetermined amount. Furthermore, using the detection area (detector) detected by the detection area determination unit 28, the human detection unit 30 verifies a corresponding human candidate and detects a human (human image).

In this way, in the image processing device 14 of the present embodiment, the detection area determination unit 28 determines a detection area (detector) in order starting from a human candidate corresponding to a human on the near side. In addition, for a human whose part of a physical body is covered by another human, the detection area determination unit 28 determines a detection area (detector) whose amount of overlapping with a detection area of a human on the near side is less than the predetermined amount.

In general, in a case of detecting a human (human image) from an image by using a detector, detection performed using a detector that involves many parts of a physical body of a human is able to utilize a large amount of characteristic. Therefore, detection accuracy is enhanced.

However, in a case of detecting a human on the back side, covered by a human on the near side, if the human on the back side is detected using a detector in a state in which many parts of a physical body of the human on the near side falls within a detection area, covered parts do not coincide with a model. Therefore, detection accuracy is reduced.

In contrast, in the image processing device 14 of the present embodiment, a detection area is determined in consideration of covering between humans. Therefore, at the time of detecting a covered human by using a detector, detection is performed using an uncovered part while not using a covered part carelessly. Therefore, detection accuracy is enhanced. In addition, since, in the image processing device 14, as wide a detection area as possible is determined within a range whose amount of overlapping with another detection area is less than the predetermined amount, it is possible to use a large amount of characteristic. Therefore, the detection accuracy is enhanced.

Therefore, according to the image processing device 14 of the present embodiment, even in a case where humans who appear in an image overlap with each other and covering is partially caused by another human, it is possible to detect a human who appears in an image with a high degree of accuracy.

Note that while, in the present embodiment, in a case where the detection area determination unit 28 determines a detection area (detector) for each of human candidates, the ranges of the detection areas of respective detectors are applied so that head part portions of the respective detectors coincide, how to apply the ranges of the detection areas is not limited. As a result, head part portions common to the respective detectors only have to coincide, and the ranges of the detection areas of the respective detectors may be applied so that the position of one of, for example, right and left end portions of each of the detectors coincides.

In addition, while a case where detection targets are humans is described in the present embodiment, the detection targets are not limited to the humans and may be other living things or inorganic substances, and detectors according to detection targets only have to be stored in the detector DB 32.

Note that while an embodiment in which the image processing program 62 is preliminarily stored (installed) in the storage unit 60 is described in the present embodiment, the image processing program 62 may be provided in a form of being recorded in a storage medium. As examples of the storage medium, a compact disc read only memory (CD-ROM), a digital versatile disk read only memory (DVD-ROM), and a universal serial bus (USB) memory may be cited.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing an image processing device that causes a computer to execute a process comprising:
    individually detecting, as a detection target candidate, a first portion of each of detection targets that appear in an image imaged by an imaging device, by using a first detection area corresponding to the first portion;
    detecting a detection target for a detection target candidate corresponding to a detection target that is not covered by another detection target and that is included in the detected detection target candidates, by using a second detection area corresponding to a second portion including the first portion and an additional portion of each of the detection targets; and
    detecting a detection target for a detection target candidate corresponding to a detection target, covered by another detection target and included in the detected detection target candidates, by using a third detection area that corresponds to a third portion including the first portion and the second portion, the detecting resulting when an amount of overlapping with the third detection area and the second detection area is less than a predetermined amount.

2. The non-transitory computer-readable storage medium according to claim 1, further causing the computer to execute the process:
    detecting whether or not being covered by the other detection target, based on a position and an orientation with respect to a detection target in a case where the imaging device images the detection target.

3. An image processing device comprising:
    a processor; and
    a memory which stores a plurality of instructions, which when executed by the processor, cause the processor to execute:
        individually detecting, as a detection target candidate, a first portion of each of detection targets that appear in an image imaged by an imaging device, by using a first detection area corresponding to the first portion;
        detecting a detection target for a detection target candidate corresponding to a detection target that is not covered by another detection target and that is included in the detected detection target candidates, by using a second detection area corresponding to a second portion including the first portion and an additional portion of each of the detection targets; and
        detecting a detection target for a detection target candidate corresponding to a detection target, covered by another detection target and included in the detected detection target candidates, by using a third detection area that corresponds to a third portion including the first portion and the second portion, the detecting resulting when an amount of overlapping with the third detection area and the second detection area is less than a predetermined amount.

4. The image processing device according to claim 3, further causing the computer to execute the process:
    detecting whether or not being covered by the other detection target, based on a position and an orientation with respect to a detection target in a case where the imaging device images the detection target.

5. An image processing method comprising:
    individually detecting, as a detection target candidate, a first portion of each of detection targets that appear in an image imaged by an imaging device, by using a first detection area corresponding to the first portion;
    detecting, by a computer processor, a detection target for a detection target candidate corresponding to a detection target that is not covered by another detection target and that is included in the detected detection target candidates, by using a second detection area corresponding to a second portion including the first portion and an additional portion of each of the detection targets; and
    detecting a detection target for a detection target candidate corresponding to a detection target, covered by another detection target and included in the detected detection target candidates, by using a third detection area that corresponds to a third portion including the first portion and the second portion, the detecting resulting when an amount of overlapping with the third detection area and the second detection area is less than a predetermined amount.

6. The image processing method according to claim 5, further comprising:
    detecting whether or not being covered by the other detection target, based on a position and an orientation with respect to a detection target in a case where the imaging device images the detection target.

* * * * *